United States Patent [19]

Yamaoka et al.

[11] 4,148,382
[45] Apr. 10, 1979

[54] VEHICLE POWER TRANSMISSION WITH BRAKE

[75] Inventors: Kojiro Yamaoka, Nishinomiya; Toshiro Azuma, Mino; Koichiro Fujisaki, Nishinomiya, all of Japan

[73] Assignee: Kanzaki Kokyukoki Mfg. Co., Ltd., Amagasaki, Japan

[21] Appl. No.: 754,551

[22] Filed: Dec. 27, 1976

[30] Foreign Application Priority Data

Oct. 1, 1976 [JP] Japan ................................ 51-118729

[51] Int. Cl.² ............................................. B60K 29/02
[52] U.S. Cl. .................................. 192/4 A; 192/109 F
[58] Field of Search ................................. 192/4 A, 4 C

[56] References Cited
U.S. PATENT DOCUMENTS

| 2,924,984 | 2/1960 | McFarland | 192/4 A X |
| 2,974,766 | 3/1961 | Perkins et al. | 192/4 A X |
| 3,136,399 | 6/1964 | Granryd | 192/4 A |
| 3,344,896 | 10/1967 | Rasmussen | 192/4 C X |
| 3,999,462 | 12/1976 | Chamberlain | 192/4 A X |

*Primary Examiner*—Benjamin W. Wyche
*Assistant Examiner*—David C. Reichard

[57] ABSTRACT

A vehicle power transmission for tractors and the like having a fluid operated speed-change mechanism which comprises a plurality of rotatably mounted speed-change gears arranged on a lay shaft and a plurality of fluid actuated clutches associated with the respective speed-change gears for selectively connecting each of the gears to the lay shaft. A brake is provided which selectively brakes the lay shaft at the non-operation state of the fluid operated speed-change mechanism. The brake prevents unexpected transmission of power through the speed-change mechanism at the non-operation state of the mechanism, thereby preventing problems such as an unexpected start of the vehicle.

5 Claims, 11 Drawing Figures

VEHICLE POWER TRANSMISSION WITH BRAKE

BACKGROUND AND SUMMARY

This invention relates to a novel and improved power transmission for tractors and the like, and more particularly to a power transmission in which a fluid operated speed-change mechanism for travelling power is employed.

There is known from U.S. Pat. Nos. 3,231,117, 3,017,941 and 3,831,690, a power transmission which is provided with a fluid operated speed-change mechanism comprising a plurality of speed-change gears which are rotatably mounted on a lay shaft arranged in the transmission path of travelling power from the engine to the final drive means such as wheels and a plurality of fluid actuated clutches each of which is associated with each of the speed-change gears for selectively connecting respective speed-change gears to the lay shaft. The power transmission having such fluid operated speed-change mechanism has an advantage that handling for the change in vehicle speed may be carried out with ease and lightness for the following reasons. The handling is carried out by handling or positioning a change-over valve for controlling the supply of fluid to fluid actuated clutches employed in the fluid operated speed-change mechanism. The speed-change mechanism of fluid actuated type does not have a factor causing some difficulty of speed-changing in a mechanically operated speed-change gearing that engagement between two speed-change gears by shifting one of the gears becomes difficult when such two gears are not faced to each other so that an engagement is achieved as they are. The fluid actuated speed-change mechanism can be handled for speed-changing without disengaging the main clutch arranged immediately behind the engine. The power transmission having a fluid operated speed-change mechanism has a further advantage that it can be made with ease such that, by gradually enlarging fluid pressure applied to fluid actuated clutches therein, no shock is caused when a speed-change is carried out.

The present invention aims to solve a problem involved with power transmissions of this type so that the foregoing advantages can be realized in tractors and the like. Theoretically, when in a tractor or the like having a fluid operated speed-change mechanism, such speed-change mechanism is in the neutral state thereof, namely when all of the fluid actuated clutches in such speed-change mechanism are in the non-operated state so that all of the rotatably mounted speed-change gears on a lay shaft on which the clutches are mounted are made freely rotatable, the power transmission path is cut off at such fluid operated speed-change mechanism so that no transmission of power ought to be caused from the engine under operation to the final drive means or from the final drive means toward the engine. In practice, however, it is often experienced that one and another friction elements of the fluid actuated clutches which elements have been released from forced engagement by fluid pressure may become engaged with some force of engagement by torque transmitted to the fluid operated speed-change mechanism from the engine or from the final drive means so that an unexpected transmission of power is caused through the fluid operated speed-change mechanism under the neutral or non-operation state of such mechanism. This may cause a dangerous unexpected start of the vehicle.

Accordingly, a primary object of the present invention is to provide a novel power transmission for tractors and the like having a fluid operated speed-change mechanism which transmission is fashioned such that the aforementioned unexpected transmission of power under the neutral state of the fluid operated speed-change mechanism is prevented with certainty.

Another object of the present invention is to provide a power transmission for tractors and the like in which such prevention of unexpected transmission of power is achieved without any particular handling.

Still another object of the present invention is to provide a novel power transmission for tractors and the like which attains such prevention of unexpected transmission of power with a simple construction.

A further object of the present invention is to provide a power transmission for tractors and the like in which lay shaft mounting fluid actuated clutches of the fluid operated speed-change mechanism is braked under the neutral state of the speed-change mechanism thereby mentioned unexpected transmission of power being prevented and in which the braking of the lay shaft is rapidly released, when the fluid operated speed-change mechanism is exchanged or turned from the neutral state to the operation state, so that there can be avoided the problem of the lay shaft becoming connected to the power source or engine under a condition that the shaft is still braked, whereas, when the fluid operated speed-change mechanism is exchanged or turned from the operation state to the neutral state, such lay shaft becomes gradually braked so that a shock which may be caused by a rapid braking does not result.

A still further object of the present invention is to provide a novel power transmission for tractors and the like which, in a case when a mechanically operated speed-change mechanism is further provided in the transmission path of travelling power in series to and at behind the fluid operated speed-change mechanism, permits an easy handling of such mechanically operated speed-change mechanism for changing the speed-change ratio notwithstanding the provision of a mechanism which prevents unexpected transmission of power through the fluid operated speed-change mechanism under the neutral state thereof.

DESCRIPTION OF THE DRAWING

The present invention and its attendant advantages will become more readily apparent as the specification is considered in conjunction with the accompanying drawings.

FIG. 2 is a schematic view of a transmission mechanism for travelling power employed in the tractor shown in FIG. 1;

DESCRIPTION OF SPECIFIC EMBODIMENT

Figure 1:
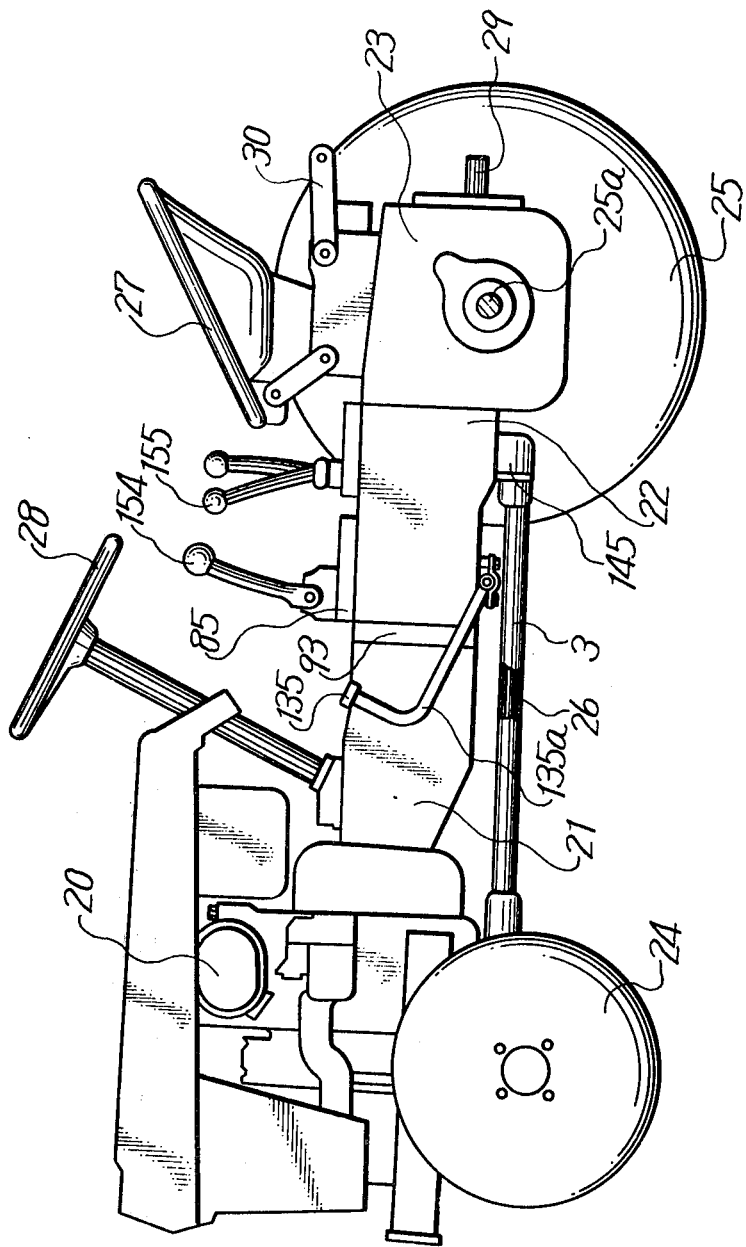
FIG. 1 is a schematic side view, partially cut away, of a tractor in which an embodiment of the power transmission according to the present invention is employed.

Referring now to the drawings, there is shown a preferred embodiment of the power transmission according to the present invention in FIGS. 1 to 9. In this case, such power transmission is equipped on a tractor for agricultural purposes shown in FIG. 1. The tractor has an engine 20 mounted on the vehicle frame structure at the front portion of the structure. The engine 20 is followed by a clutch housing 21, front transmission case 22 and rear transmission case 23 which housing and cases constitute parts of the vehicle frame structure. The vehicle frame structure rotatably supports left and right front wheels 24 at below the engine 20 and left and right rear wheels 25 at the rear transmission case 23. As detailed later, the tractor is driven to travel by driving the rear wheels 25. When the tractor is travelled on muddy earth or the like which requires a large power for travelling, the front wheels 24 are also driven in addition to the driving of the rear wheels 25. For such selective driving of the front wheels 24, a transmission shaft 26 is provided which transmits drive power from within the front transmission case 22 to the front wheels 24. The steering of the tractor is carried out by an operator on a seat 27 above the rear transmission case 23 by handling a steering handle 28 so that the front wheels 24 are turned through a steering mechanism not shown in the drawings. This tractor for agricultural purposes is used in a manner such that a working machine such as a rotary plow (not shown) is connected to the rear end of the tractor by a connecting mechanism not shown in the drawings. A power output shaft 29 is provided at the rear end of the tractor for transmitting the engine power to such working machine. Further, on the rear transmission case 23 is provided a lift arm 30 which is operated by a hydraulic means so as to lift such working machine from a working position to a waiting position.

Figure 2:
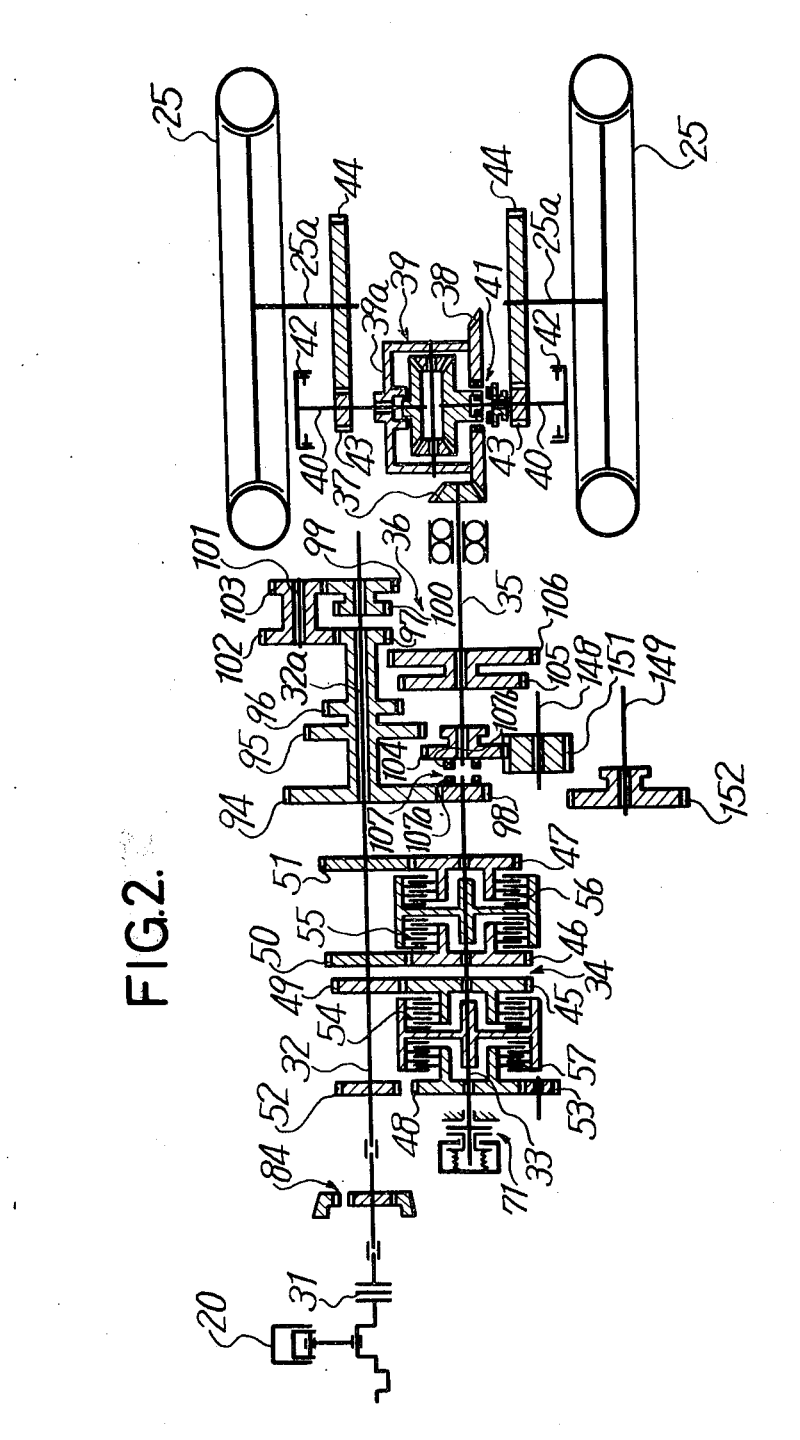
Figure 8:
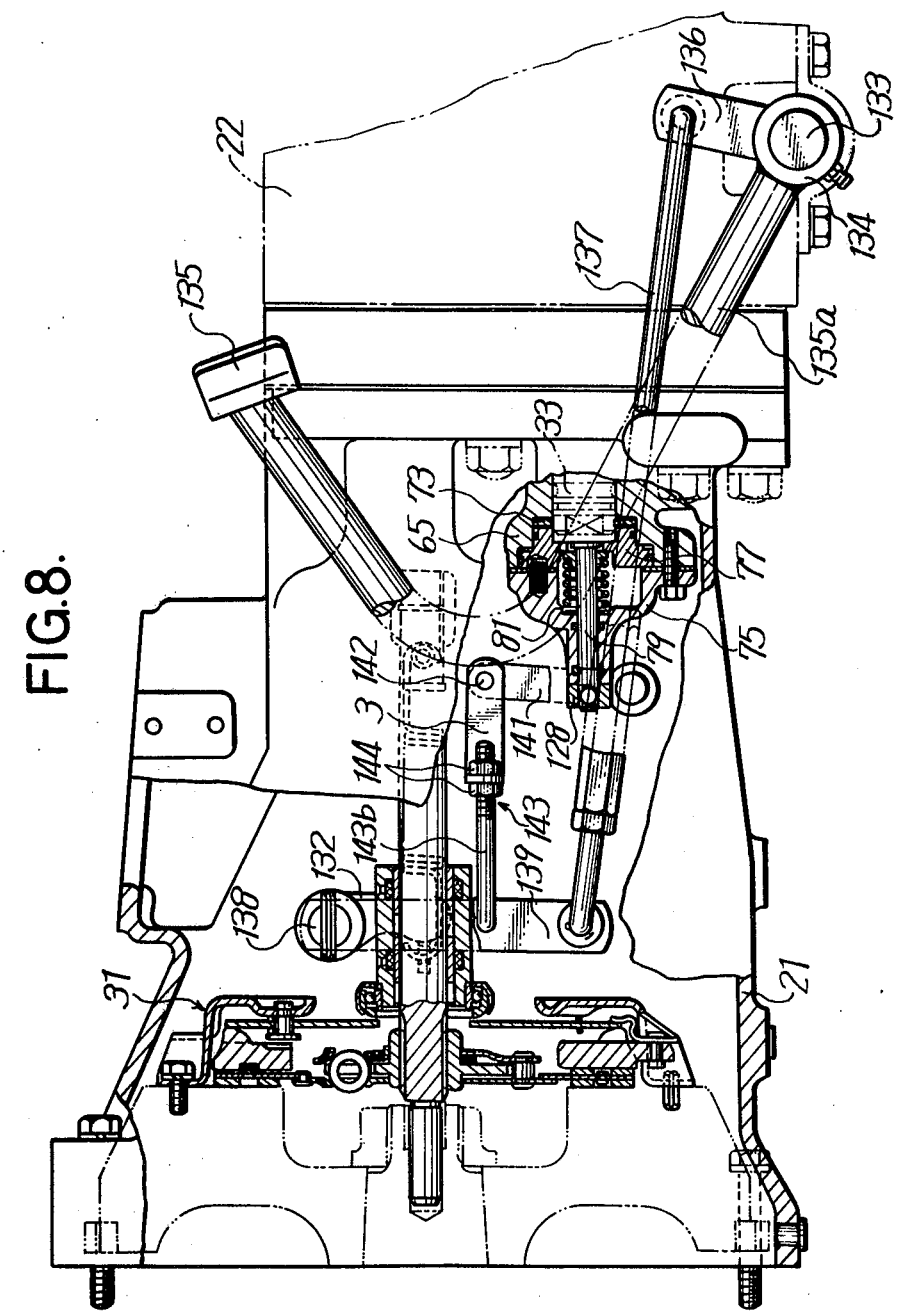
FIG. 8 is a side view, partially cut away and partially in section, of clutch housing employed in the tractor shown in FIG. 1.

As shown in FIG. 2, the power transmission which transmits power for travelling the tractor from the engine 20 to the rear wheels 25 comprises a main clutch 31, the details of which are shown in FIG. 8, arranged in the clutch housing 21 for selectively cutting off the transmission of the engine power toward the rear direction, a fluid operated speed-change mechanism 34 which connects a drive shaft 32 connected to the engine 20 via the main clutch 31 to a lay shaft 33 arranged in parallel to the drive shaft 32 in a selected speed-change ratio, a mechanically operated speed-change mechanism 36 which is arranged between a rear extension 32a of the drive shaft 32 and another lay shaft 35 arranged concentrically with the lay shaft 33 for connecting the lay shaft 33 to the lay shaft 35 in a selected speed-change ratio, a differential gearing 39 of the conventional type which is connected to the lay shaft 35 through bevel gears 37 and 38 and which gives a difference in rotation speed of the left and right rear wheels 25 when the vehicle is turned, a lock means 41 which is formed, by way of example, as a claw clutch for selectively connecting one of the output shaft 40 of the differential gearing 39 to the cage 39a of the gearing so as to disactuate the differential gearing 39, a pair of brake means 42 which are provided to the ends of the left and right output shafts 40 of the gearing 39 for selectively braking the left and right rear wheels 25, and a pair of final speed-reducing gearings comprising gears 43 and 44 which connect the left and right output shafts 40 to the wheel shafts 25a of the left and right rear wheels.

Figure 3:
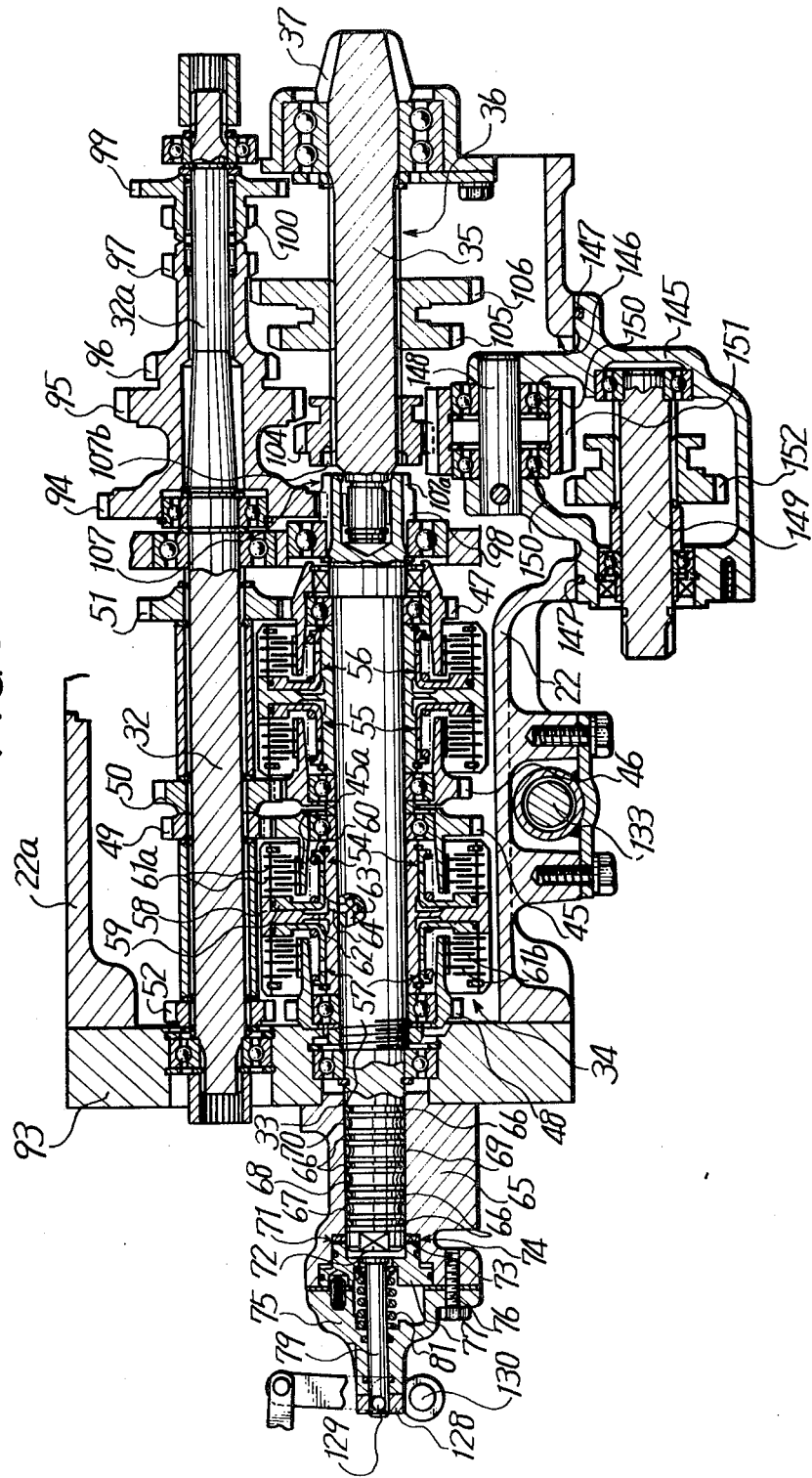
FIG. 3 is a sectional side view of a part of the tractor shown in FIG. 1 showing an essential part of the power transmission mechanism.

The fluid operated speed-change mechanism 34 and the mechanically operated speed-change mechanism 36 are arranged within the mentioned front transmission case 22, as shown in FIG. 3. The transmission members located behind the bevel gear 37 are arranged within the mentioned rear transmission case 23 or at the side of such case 23. Within the rear transmission case is further arranged a transmission mechanism for transmitting power from the rear extension 32a to the mentioned power output shaft 29, although this is omitted from the drawings. Because the mechanisms arranged within the rear transmission case 23 are of conventional types and have nothing to do with the present invention, further explanations on such mechanisms are omitted.

As shown in FIGS. 2 and 3, the fluid operated speed-change mechanism 34 comprises four rotatably mounted gears 45 to 48 which are rotatably mounted on the lay shaft 33 through bearings, namely an $F_1$-or first forward direction rotatable gear 45 which is in constant mesh with an $F_1$-or first forward direction gear 49 fixedly mounted on the drive shaft 32, an $F_2$-or second forward direction rotatable gear 46 which is in constant mesh with an $F_2$-or second forward direction gear 50 fixedly mounted on the drive shaft 32, an $F_3$-or third forward direction rotatable gear 47 which is in constant mesh with an $F_3$-or third forward direction gear 51 fixedly mounted on the drive shaft 32, and an R-or backward direction rotatable gear 48 which is in constant mesh with an R-mid gear 53 (FIG. 2) which in turn is in constant mesh with an R-or backward direction gear 52 fixedly mounted on the drive shaft 32. With these rotatable gears 45, 46, 47 and 48 are associated respectively fluid actuated $F_1$-clutch 54, $F_2$-clutch 55, $F_3$-clutch 56 and R-clutch 57 which connect selectively the respective rotatable gears to the lay shaft 33 when actuated. Each of the fluid actuated clutches 54–57 is of the conventional type and is operable by pressure fluid.

A brief description will be given with respect to one of the clutches, namely $F_1$-clutch 54 associated with the $F_1$-rotatable gear 45, it being understood that the other clutches are of similar construction. As shown in FIG. 3, the clutch 54 comprises a cylinder 58 fixedly mounted on the lay shaft 33, a piston 59 slidably inserted into the cylinder 58 in a fluid-tight manner and biased to a clutch-disengaging position by a spring 60, friction elements 61a slidably but not rotatably supported by the cylinder 58, and other friction elements 61b slidably but not rotatably supported by hub portion 45a of the gear 45 extending from said gear into the cylinder 58. When pressure fluid is supplied into a fluid chamber 62 formed within the cylinder 58 at behind the piston 59 through a fluid passage 63 perforated through the lay shaft 33 and through a fluid passage 64 perforated through the cylinder 58, the piston 59 is advanced against the force of the spring 60 to cause frictional engagement between the elements 61a and 61b so that the clutch 54 is engaged or actuated resulting in connection of the gear 45 to the lay shaft 33.

Accordingly, the lay shaft 33 can be driven to rotate by the drive shaft 32 selectively with a first forward direction speed by connecting the lay shaft 33 to the drive shaft 32 through the gears 49 and 45 by the actuation of the $F_1$-fluid actuated clutch 54 which selectively connects the $F_1$-rotatable gear 45 to the lay shaft 33, with a second forward direction speed by connecting the lay shaft 33 to the drive shaft 32 through the gears 50 and 46 by the actuation of the $F_2$-fluid actuated clutch 55 which selectively connects the $F_2$-rotatable gear 46 to the lay shaft 33, with a third forward direction speed by connecting the lay shaft 33 to the drive shaft 32 through the gears 51 and 47 by the actuation of the $F_3$-fluid actuated clutch 56 which selectively connects the $F_3$-rotatable gear 47 to the lay shaft 32, or with a first backward direction speed by connecting the lay shaft 33 to the drive shaft 32 through the gears 52, 53 and 48 by the actuation of the R-fluid actuated clutch 57 which selectively connects the R-rotatable gear 48 to the lay shaft 33. It is thus seen that the fluid operated speed-change mechanism 34 is constructed such that, by the operation of the mechanism 34, the lay shaft 33 is driven to rotate by the drive shaft 32 with a first forward direction speed, a second forward direction speed, a third forward direction speed or a first backward direction speed by the selective actuation of one of the fluid actuated clutches 54, 55, 56 or 57.

Theoretically, when the fluid operated speed-change mechanism 34 is brought to the neutral state thereof, namely when all of the fluid actuated clutches 54 to 57 are brought to non-actuated state, the lay shaft 33 ought to be disconnected from the drive shaft 32 so that the lay shaft 33 ought to be kept in its stopped condition. In practice, however, the friction elements 61a and 62b of the fluid actuated clutches 54 to 57 may be engaged with some frictional force by a torque transmitted to the drive shaft 32 from the engine 20 or by a torque transmitted to the lay shaft 33 from the rear wheels 25 which tend to rotate automatically when the tractor is on a slope or the like. Such engagement of the friction elements or fluid actuated clutches can cause an unexpected rotation of the lay shaft 33. Accordingly, in the power transmission shown, there is provided, according to the present invention, a mechanism for preventing such unexpected rotation of the lay shaft 33, as detailed hereinafter.

As shown in FIG. 3, the front portion of the lay shaft 33 is projected outwardly and forwardly from the front transmission case 22. At such front portion, the lay shaft 33 is covered by a seal housing 65 which forms a plurality of fluid chambers 67, 68, 69 and 70 therein in cooperation with annular recesses on the lay shaft 33. To the respective fluid chambers 67 to 70 which are sealed from one another by sealing members 66 is once introduced fluid for actuating the respective clutches 54 to 57 which fluid is then supplied from the chambers 67-70 to the fluid actuated clutches 54-57 through the mentioned fluid passages 63 and 64. At such front portion of the lay shaft 33 is arranged a brake means 71 for selectively braking the lay shaft 33. As clearly shown in FIG. 4, the brake means 71 comprises a movable friction disc 73 which is mounted slidably along the lay shaft 33 but not rotatably on the end portion having a reduced diameter of the lay shaft 33 by utilizing flatly cut-off portions 72 of such end portion. The rear face of the movable friction disc 73 having a friction-elevating material at front and rear faces thereof is faced to a stepped engaging face 74 of the seal housing 65. The lay shaft 33 is restrained from its rotation or is braked when the movable friction disc 73 is forced toward the right of FIG. 4 so that the inner face of the disc is engaged to the engaging face 74 of the seal housing 65 which is fixed in position. Within the seal housing 65 the front opening of which is covered by a housing cover 75 secured to the housing by bolt means 76 is slidably inserted a piston 77 in a fluid-tight manner. The piston 77 is restrained from rotation by a pin 78 which is secured to the housing cover 75 at one end and is inserted to a bore of the piston 77 at the other end. The housing cover 75 slidably supports a slide bar 79 having a head 79a of a large diameter which is positioned in a center perforation of the piston 77. On the slide bar 79 is arranged a compression spring 81 which is received at one end by the inner face of the housing cover 75 and at the other end by a spring-receiver 80 slidably mounted on the slide bar 79 and engaged to the end face of the piston 77. The movable friction disc 73 is thus engaged to the engaging face 74 by the force of the spring 81 through the piston 77, whereby the lay shaft 33 is braked.

The brake means 71 is constructed such that the lay shaft 33 is braked only when the fluid operated speed-change mechanism 34 is in its neutral state and such braking is released when the speed-change mechanism 34 is in its operation state. Such releasing of braking action is effected by a fluid actuator 77A including the mentioned piston 77. That is, the releasing is effected by a supply of pressure fluid to a fluid chamber 82 formed within the seal housing 65 at behind the piston 77. By such supply of pressure fluid, the piston 77 is retreated (forwardly along the vehicle) against the force of the spring 81 so that the braking is released. In the power transmission shown, pressure fluid for actuating the fluid actuated clutches 54 to 57 of the fluid operated speed-change mechanism 34 is selectively supplied to the fluid chamber 82 from fluid supply circuit for the clutches 54 to 57 which circuit is shown in FIG. 5.

Figure 4:
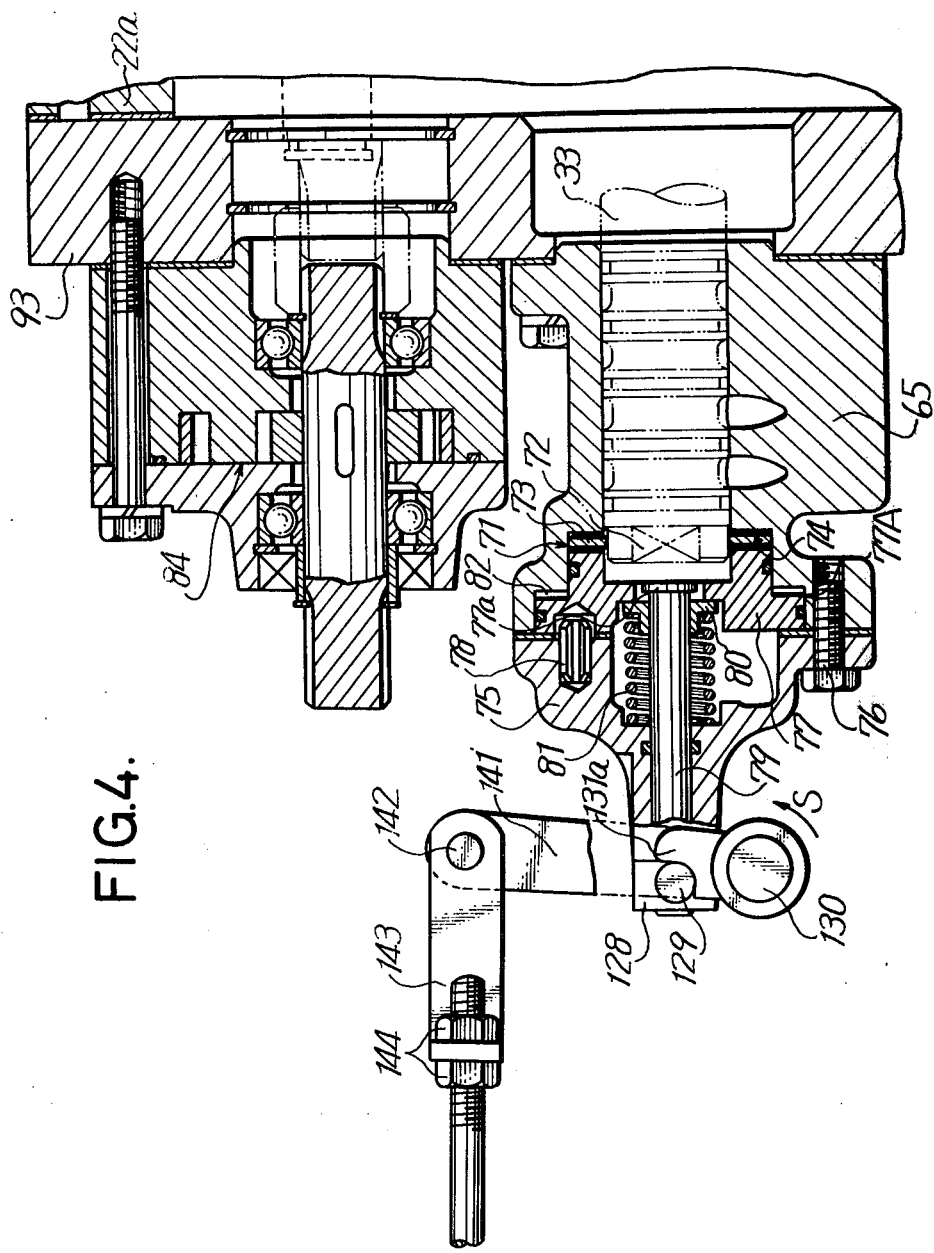
FIG. 4 is an enlarged sectional side view of a part of the mechanism shown in FIG. 3.

Fluid for actuating the fluid actuated clutches 54 to 57 is introduced from a fluid tank 83, which is formed by the lower part of the front transmission case 22, into a valve housing 85 (FIG. 1) on the case 22 by a gear pump 84 of conventional trochoid type. The pump is installed to the front face of the transmission case 22 within the clutch housing and between the main clutch 31 and the drive shaft 32 and is driven by the engine 20, as shown in FIGS. 2 and 4. The fluid is then introduced selectively from within the valve housing 85 to the fluid chambers 67 to 70 at the end of the lay shaft 33 through fluid passages mentioned later and then is applied to the clutches 54-57. Within the valve housing 85 are arranged a relief valve 88 for determining fluid pressure applied to the fluid actuated clutches 54 to 57 which valve is inserted in a path or circuit 87 connected to a fluid supply path or circuit 86 directing from the fluid tank 83 toward the clutches 54 to 57 via the pump 84, and a control valve or change-over valve 89 which is inserted in the fluid supply circuit 86 for selectively connecting said circuit 86 to one of the fluid actuated clutches.

Figure 5:
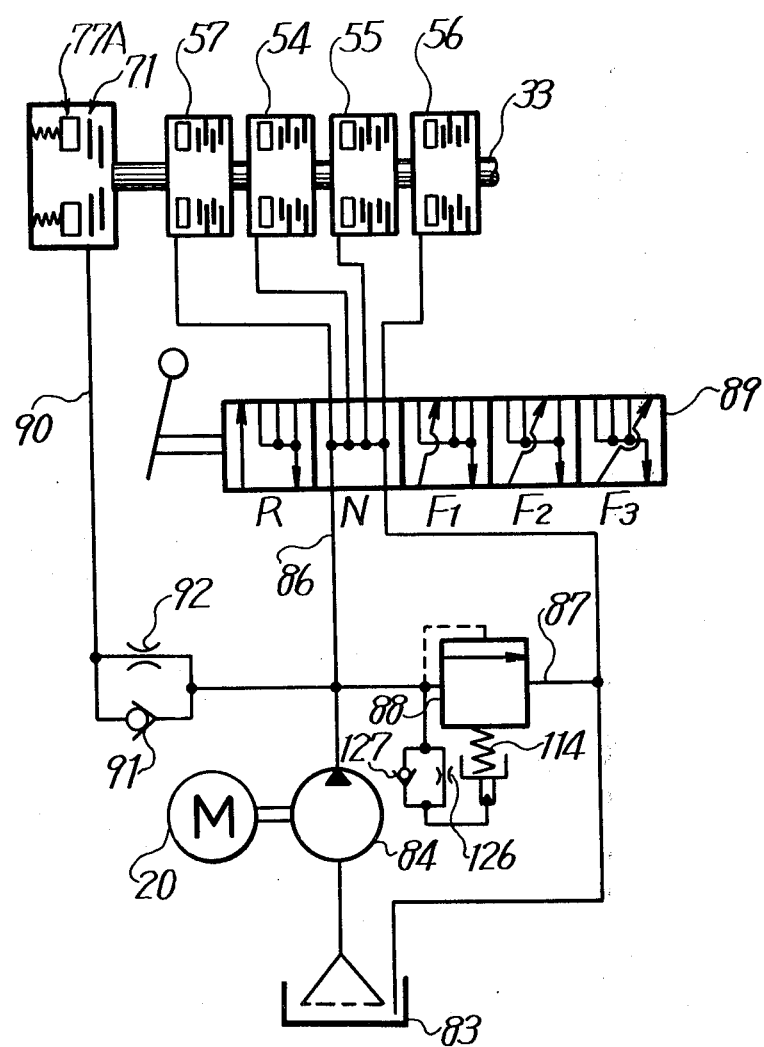
FIG. 5 is a schematic illustration of fluid circuit employed in the power transmission mechanism.

As can be seen from FIG. 5, the change-over valve 89 has five positions, namely a neutral position N in which fluid is drained toward the fluid tank 83 from all of the fluid actuated clutches 54 to 57 so that all of the clutches 54 to 57 are disengaged or the fluid operated speed-change mechanism 34 is brought to the neutral state, a first forward direction position $F_1$ in which only the $F_1$-clutch 54 is supplied with pressure fluid and fluid is drained from the other clutches so that only the $F_1$-clutch 54 is actuated, a second forward direction position $F_2$ in which only the $F_2$-clutch 55 is supplied with pressure fluid and fluid is drained from the other clutches so that only the $F_2$-clutch 55 is actuated, a third forward direction position $F_3$ in which only the $F_3$-clutch 56 is supplied with pressure fluid and fluid is drained from the other clutches so that only the $F_3$ clutch 56 is actuated, and a backward direction position R in which only the R-clutch 57 is supplied with pressure fluid and fluid is drained from the other clutches so that only the R-clutch 57 is actuated.

The fluid circuit detailed hereinbefore is of conventional construction. From the mentioned fluid supply circuit 86 is branched, as also shown in FIG. 5, a fluid path or circuit 90 which is connected to the mentioned fluid actuator 77A or the fluid chamber 82 thereof. Accordingly, pressure fluid having a pressure determined by the relief valve 88 is supplied to the fluid chamber 82 through the fluid circuit 90 at the operation positions $F_1$, $F_2$, $F_3$ and R of the change-over valve 89, namely at the operation state of the fluid operated speed-change mechanism 34 so that the piston 77 is retreated resulting in releasing of braking operation by the brake means 71, whereas, at the neutral position N of the change-over valve 89 where the fluid supply circuit 86 is connected to the fluid tank 82 through the valve 89, namely at the neutral or non-operation state of the fluid operated speed-change mechanism 34, fluid is drained from the fluid chamber 82 toward the fluid tank 83 through the fluid circuit 90 thereby the brake means 71 being operated. In the power transmission shown, there are particularly inserted in the fluid circuit 90 a check valve 91 and a throttle 92 connected in parallel, as also shown in FIG. 5. The check valve 91 is fashioned such that it permits a flow of fluid only along a direction from the fluid supply circuit 86 toward the fluid actuator 77A or the fluid chamber 82 thereof. Accordingly, fluid pressure is rapidly applied to the fluid actuator 77A through the check valve 91 resulting in a rapid releasing of the braking of the lay shaft 33 by the brake means 71 when the position of the change-over valve 89 is changed from the neutral position N toward an operation position, whereas, when the change-over valve 89 is returned from an operation position to the neutral position N. fluid is slowly drained from the fluid chamber 82 of the fluid actuator 77A through the throttle 92 so that the brake means 71 gradually brakes the lay shaft 33.

Owing to the above detailed operation mechanism for the brake means 71 for braking the lay shaft 33, the brake means 71 brakes or restrains the lay shaft 33 so as not to be rotated by the action of the spring 81 when the fluid operated speed-change mechanism 34 is brought to its neutral state by the change of the position of the change-over valve 89, so that an unexpected rotation of the lay shaft 33 which may cause an unexpected start of the vehicle or other problems is prevented with certainty. Contrarily, in the operation state of the fluid operated speed-change mechanism 34, the braking operation by the brake means 71 is released so that the lay shaft 33 is released from braking, whereby power is transmitted through such lay shaft 33 without any trouble. Further, because the braking operation by the brake means 71 is rapidly released by the rapid application of pressure fluid through the check valve 91 when the fluid operated speed-change mechanism 34 is turned from its non-operation state to its operation state by changing the position of the change-over valve 89, there is not caused the problem of the lay shaft 33 becoming connected to the drive shaft 32 under a condition that the lay shaft 33 is still braked by the brake means 71. Damage of transmission members which may be caused by such earlier connection of the shaft 33 to the drive shaft 32 is thereby prevented. Furthermore, because the braking of the lay shaft 33 by the braking means 71 is gradually effected owing to a gradual drain of fluid through the throttle 92 when the fluid operated speed-change mechanism 34 is turned from the operation state to the non-operation state, a shock which may be caused by a rapid braking of the lay shaft 33 and which may also cause damage to transmission members is not caused.

Fluid passages communicating from the pump 84 to the inside of the valve housing 85 are constituted by fluid passages perforated through a passage-forming plate 93, which is secured to the front face of the front transmission case 22, and by fluid passages perforated through the top wall 22a of the transmission case 22. Further, fluid passages communicating from the inside of the valve housing 85 to the fluid chambers 67 to 70 and fluid chamber 82 are constituted by fluid passages perforated through the top wall 22a of the case 22, fluid passages perforated through the pssage-forming plate 93 and fluid passages perforated through the seal housing 65. Details of such fluid passages are omitted from the drawings.

Figure 6:
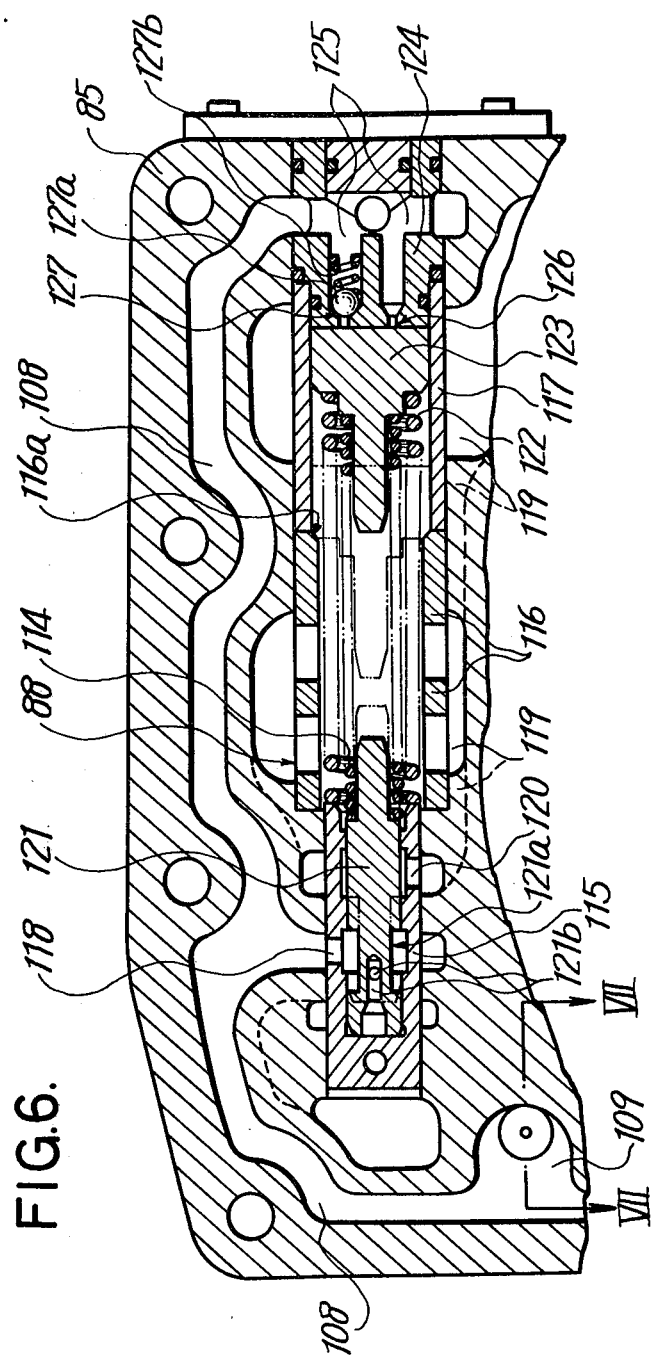
FIG. 6 is a cross-sectional plane view of a part of valve housing employed in the tractor shown in FIG. 1.
Figure 7:
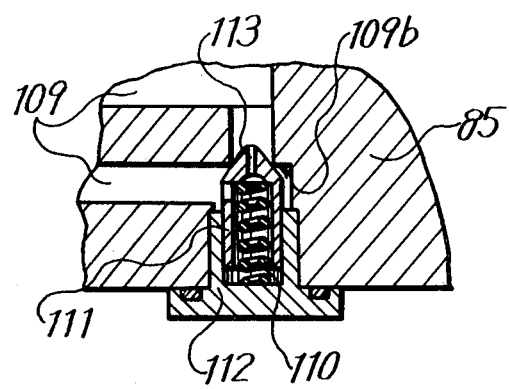
FIG. 7 is a sectional view taken along line VII—VII of FIG. 6.

The circuit construction having the mentioned check valve 91 and throttle 92 for rapidly supplying and slowly draining fluid which is used for releasing the braking operation of the brake means 71 by the fluid actuator 77A may be embodied, by way of example, as follows: Within the valve housing 85 a part of which is shown in FIGS. 6 and 7 is formed a fluid passage 108 which is communicated to the outlet of the pump 84. From this fluid passage 108 is branched a fluid passage 109 which corresponds to the mentioned fluid circuit 90 communicating to the fluid chamber 82 of the fluid actuator 77A. In this latter fluid passage 109 is provided a structure in which the check valve 91 and the throttle 92 are combined. That is, as shown in FIG. 7, a hollow poppet 111 which shuts the fluid passage 109 by the engagement of such poppet to a step 109a of the passage 109 under the force of a compression spring 110 is inserted in the fluid passage 109 by slidably receiving such poppet by means of a receiver 112 which is secured to the housing 85 and which receives one end of the spring 110. This hollow poppet 111 is formed with a small perforation 113 which permits a flow of fluid through the fluid passage 109 only with a small rate. Accordingly, when a high fluid pressure is established in the fluid supply circuit 86 or in the above mentioned passage 108 under the operation position $F_1$, $F_2$, $F_3$ and R of the change-over valve 89, the poppet 111 is retreated against the force of the spring 110 so that the fluid passage 109 is largely opened, whereby pressure fluid is rapidly supplied to the fluid chamber 82 of the fluid actuator 77A. Contrarily, the poppet 111 is advanced to a position shown in FIG. 7 by the action of the spring 110 under the neutral position N of the change-over valve 89 so that fluid is drained from the fluid chamber 82 slowly or gradually through the small perforation 113. Accordingly, as already stated before, the braking of the lay shaft 33 is rapidly released when the fluid operated speed-change mechanism 34 is turned into its operation state by turning the change-over valve 89 into an operation position, whereas the lay shaft 33 is gradually braked when the fluid operated speed-change mechanism 34 is turned into its non-operation state by turning the change-over valve 89 into the neutral position.

As can be seen from FIG. 5, the relief valve 88 employed for determining or establishing fluid pressure applied to the fluid actuated clutch 54 to 57 is constructed such that pressure-determining compression spring 114 of such relief valve is gradually compressed by the action of fluid pressure from the time of positioning the change-over valve 89 to an operation position so that fluid pressure applied to the clutches is gradually enlarged.

One embodiment of this will be described by referring to FIG. 6. In bores formed within the valve housing 85 manufactured by molding from aluminum alloy or the like are tightly fitted, as shown in FIG. 6, tubular case members of steel 115, 116, and 117 which form the valve case of the relief valve 88. The case member 115 of base end is formed with an inlet port 118, which opens at the mentioned fluid passage 108 communicated to the pump 84, and an outlet port 120 which opens at a fluid passage 119 formed within the housing 84 and communicated to the fluid tank 83. In the case member 115 is slidably inserted a valve piston 121 which receives the base end of the pressure-determining compression spring 114.

The valve piston 121 is advanced by fluid pressure in the fluid passage 108 which is applied behind the piston 121 through a space around a reduced diameter portion 121a of the piston and a perforation 121b within the piston 121. When the valve piston 121 is advanced to a position shown by the imaginary lines by such fluid pressure, the piston 121 communicates the inlet port 118 to the outlet port 120 so that relief operation begins, as is usual in a relief valve.

In the relief valve 88 shown, the other end of the pressure-determining spring 114 is particularly received by a control piston 123 which is slidably inserted in the case member 117 and is biased by another compression spring 122 toward the right of FIG. 6. Fluid pressure in the fluid passage 108, namely fluid pressure in the fluid supply circuit 86, is also applied behind this control piston 123 in a fashion detailed hereinafter.

A fluid chamber 125 is formed behind a cover 124 which is tightly fitted into the base end of the case member 107, and fluid passage 108 communicates with the fluid chamber. Further, the cover 124 is formed with a pair of parallel fluid passages, mamely a throttle or narrowed fluid passage 126, which communicates the fluid chamber 12 to behind the control piston 123, and another fluid passage in which a check valve 127 having a ball 127a and a spring 127b is inserted and which permits flow of fluid only along the direction from behind the piston 123 toward the fluid chamber 125.

Accordingly, from the time when the change-over valve 89 becomes positioned to an operation position, fluid is gradually supplied behind the control piston 123 via the fluid passage 108 and fluid chamber 125 and through the throttle 126 so that the control piston 123 is gradually advanced, resulting in a gradual compression of the pressure-determining spring 114, whereby force or pressure caused by the spring 114 is gradually enlarged. Consequently, fluid pressure in the fluid passage 108, namely fluid pressure established in the fluid supply circuit 86 which pressure is applied to the fluid actuated clutches is gradually enlarged to a pressure corresponding to the force or pressure caused by the spring 114 when the control piston 123 has been advanced to its most advanced position shown by imaginary lines where the control piston engages an end 116a of the case member 116. As a result, a rapid application of a high fluid pressure to the fluid actuated clutches 54 to 57 is not resulted so that there can be prevented damages of the clutches 54 to 57 and transmission members associated therewith due to a shock caused by such rapid application of a high fluid pressure and also a shock applied to the operator for the vehicle. Further, when the fluid actuated clutches 54 to 57 or fluid operated speed-change mechanism 34 become non-operated by returning the change-over valve 89 to its neutral position, fluid is rapidly drained from behind the control piston 123 toward the fluid passage 108 through the fluid passage having the check valve 127 therein so that the control piston 123 is rapidly returned to its original position.

In the lower transmission shown, there is further provided a manually operated releasing means for the brake means 71 so that, when required, the braking of the lay shaft 33 by the brake means may be released by such releasing means even at the neutral state of the fluid operated speed-change mechanism 34. Because such releasing means is provided due to the provision of the mentioned mechanically operated speed-change mechanism 36 behind the fluid operated speed-change mechanism 34, the construction of the mechanically operated speed-mechanism 36 will be described next by referring again to FIGS. 2 and 3.

As shown in FIGS. 2 and 3, the mechanically operated speed-change mechanism 36 comprises four gears 94, 95, 96 and 97 having diameters different from one another and having a common boss portion. The gears are rotatably mounted on the extension 32a of the drive shaft 32 through bearings and are driven to rotate by the lay shaft 33 through a gear 98 which is formed on the lay shaft 33 and is in constant mesh with the gear 94. Two gears 99 and 100 having a common boss portion are rotatably mounted on the extension 32a of the drive shaft 32 through bearings and are driven to rotate by the gear 97 through gears 102 and 103 (FIG. 2) having a common boss portion on a mid shaft 101. A shiftable gear 104 and two shiftable gears 105 and 106 having a common boss portion are slidably but not rotatably mounted on another lay shaft 35. A claw clutch 107 includes claws 107a formed at the end of the lay shaft 33 and claws 107b formed at the end face of the shiftable gear 104.

This mechanically operated speed-change mechanism 36 is operated by displacing the shiftable gears 104, 105 and 106 selectively on and along the lay shaft 35. The lay shaft 35 is driven to rotate by the lay shaft 33 at a first speed (very low speed) when the shiftable gear 106 is meshed with the gear 100, at a second speed when the shiftable gear 106 is meshed with the gear 97, at a third speed when the shiftable gear 105 is meshed with the gear 96, at a fourth speed when the shiftable gear 104 is meshed with the gear 95, and at a fifth speed when the claw clutch 107 is operated by displacing the shiftable gear 104 to cause the engagement of the claws 107a and 107b, respectively.

As detailed hereinbefore, the mechanically operated speed-change mechanism 36 has a function that it can change the travelling speed of the vehicle further into five stages behind the fluid operated speed-change mechanism. The order of arrangement of such two kinds of speed-change mechanisms 34, 36 that the fluid operated speed-change mechanism 34 is located before and the mechanically operated speed-change mechanism 36 is located behind is advantageous because the fluid operated speed-change mechanism is located at a location where rotation torque is relatively small so that the fluid actuated clutches 54 to 57 may be made small in capacity. There is, however, a problem in handling, under a condition in which the main clutch 31 has been disengaged, the mechanically operated speed-change mechanism 36 so as to change the speed-change ratio by the mechanism 36, namely in displacing or shifting selectively the shiftable gears 104, 105 and 106. That is, unless the shiftable gears 104, 105 and 106 and claws 107b are positioned relative to the gears 95, 96, 97 and 100 and claws 107a along the direction of rotation properly so that the former gears and claws may be engaged by the latter gears and claws as they are, it becomes difficult to engage the former shiftable members to the latter fixed members because the positions of the latter fixed members 95, 96, 97 and 100 along the direction of rotation are fixed by the braking of the lay shaft 33 by the brake means 71. Accordingly, the power transmission shown is constructed such that, when the mechanically operated speed-change mechanism 36 is handled so as to change the speed-change ratio thereby, the members 95, 96, 97 and 100 and 107a to which the shiftable members 104, 105, 106 and 107b are to be engaged can be made rotatable by releasing the braking of the lay shaft 33 by the brake means 71 so that, even in the case of improper position for engagement, the members 95, 96, 97 and 100 and 107a may be somewhat rotated by being forced toward the direction of rotation by the displacement of the shiftable gears, thereby easily attaining the required engagement.

Figure 9:
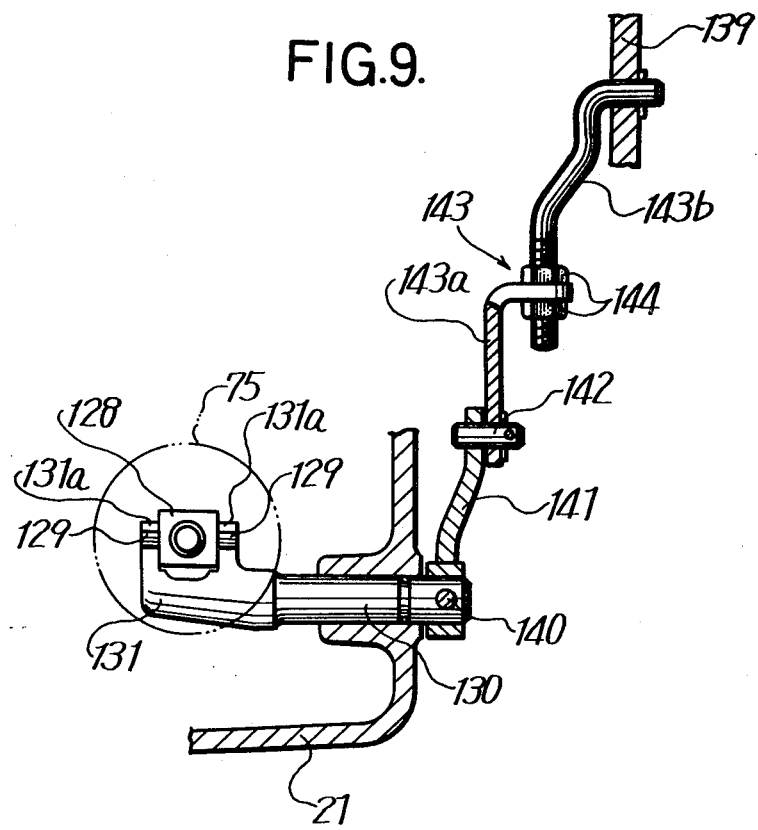
FIG. 9 is a front elevational view, partially omitted, of the part shown in FIG. 8.

The mechanism for this will be described hereinafter by referring to FIGS. 8 and 9 and also to FIGS. 3 and 4. To the base end of the mentioned slide bar 79 which is slidably supported by the housing cover 75 is secured a stopper 128 which may engage to the outer face of the cover 75 to limit the movement of the bar 79 toward the inside of the seal housing 65. To this stopper 128 are secured a pair of pins 129 which project toward the left and right. The clutch housing 21 supports a rotatable shaft 130 which extends through a side wall of the housing 21. To one end of this shaft 130 is fixedly mounted at within the clutch housing 21 a rotator 131 having a pair of projections 131a which are engaged to the pins 129 from behind. Consequently, when the rotatable shaft 130 is rotated along the direction of arrow S shown in FIG. 4, the projections 131a of the rotator 131 which is revolved round the axis of the shaft 130 push the pins 129 so as to move the stopper 128 toward the direction of pulling out the slide bar 79. After the head 79a of the slide bar 79 becomes engaged to the spring-receiver 80 by the outward displacement of the bar 79, the spring-receiver 80 is retreated apart from the piston 77 against the force of the spring 81 by a further outward displacement of the slide bar. The compression or force applied to the movable friction disk 73 through the piston 77 is thus released so that, even when fluid pressure is not applied to the fluid chamber 82, the braking by the brake means 71 can be released. This mechanism for releasing the braking is particularly constructed such that it is operated together with the disengaging operation of the main clutch 31.

As shown in FIG. 8, the main clutch is a mechanically operated clutch of conventional friction disc type and is disengaged by a rotation of a rotator 132 for actuating a clutch-disengaging cam. The rotator 132 is operated by a pedal 135 which is supported by securing arm portion 135a thereof to a rotatable pipe 134 which in turn is rotatably mounted on an end portion of a support shaft 133 fixedly supported by the bottom wall of the front transmission case 22. The releasing mechanism is constructed such that, when the pedal 135 is pushed down for disengaging the main clutch 31, the rotatable shaft 130 is rotated toward the direction of arrows S (FIG. 4) resulting in releasing the braking action of the brake means 71, as fully detailed hereinafter.

As shown in FIG. 8, an arm 136 secured to the rotatable pipe 134 which is rotated by the pushing of the pedal 135 is operatively connected to the rotator 132 through a rod 137, a revolving arm 139 secured at one end thereof to a rotatable shaft 138 on which the rotator 132 is fixedly mounted, and the said rotatable shaft 138. Meanwhile, the rotatable shaft 130 which moves the slide bar 79 to slide toward the direction of releasing the braking of the brake means 71 is operatively connected, as shown in FIGS. 8 and 9, to the revolving arm 139 in the handling mechanism for the main clutch through a revolving arm 141 secured to the rotatable shaft 130 by means of a pin 140 and another revolving arm 132 rotatably connected to the former arm 141 by means of a pin 142 in a fashion such that a revolution of the revolving arm 139 toward the direction of disengaging the main clutch causes the rotation of the rotatable shaft 130 toward the direction of arrow S.

In addition, the revolving arm 143 employed in the just mentioned connecting mechanism is composed of a plate member 143a and a rod member 143b which members are fixedly connected to each other by a pair of nut means 144 on the threaded end of the rod member 143b. The revolving arm 143 may be thus changed in length so that the timing of disactuating the brake means 71 relative to the disengaging of the main clutch 31 can be adjusted or controlled by changing the length of the arm 143.

Because the power transmission shown is constructed, as detailed hereinbefore, such that the braking of the lay shaft 33 by the brake means 71 is released together with the disengaging of the main clutch 31 which is disengaged prior to the handling of the mechanically operated speed-change mechanism 36, such mechanically operated speed-change mechanism 36 can be handled to change the speed-change ratio with ease notwithstanding the provision of the brake means 71.

The other parts of the power transmission shown will be described briefly. The selective transmission of driving power to the front wheels 24 is made by the following mechanism. As shown in FIG. 3, there is provided at the bottom of the front transmission case 22 a power output housing 145 the upper half of which is inserted into the transmission case 22 through an opening 146 formed to the bottom wall of the case 22 with providing a seal ring 14 between the case 22 and this housing 145. This power output housing 145 supports a fixed shaft 148 within the case 22 and a rotatable shaft 149 arranged in parallel to the former shaft 148 at outside the case 22. On the fixed shaft 148 is rotatably mounted through bearings 150 a gear 151 having a large width such that it constantly meshes with the shiftable gear 104 on the lay shaft 35 at any positions of the shiftable bear 104. On the rotatable shift 149 is slidably but not rotatably mounted a shiftable gear 152 which is displaced selectively on and along the shaft 149 so as to mesh with the gear 151 by a manual handling or displacing means not shown in the drawings. Consequently, so far as the lay shaft 35 which is in constant connection with the rear wheels 25 is rotated, the gear 151 is rotated through the shiftable gear 104 which is not rotatable relative to the lay shaft 35. The rotatable shaft 149 can thus be driven to rotate by meshing the shiftable gear 152 with such gear 151. Meanwhile, the rotatable shaft 149 is connected at the front end projected outwardly from the housing 145 to the mentioned transmission shaft 26 (FIG. 1) through a flexible joint means not shown in the drawings. The transmission shaft 26 is then connected to a differential gearing (not shown) for the front wheels 24 which gearing in turn is connected to the wheel shafts of the front wheels 24. Because connecting mechanism for such connection may be constructed in any of the known fashions and has nothing to do with the present invention, illustration and further descriptions will be omitted. In addition, the transmission shaft 26 is covered by an outer pipe 153, as shown in FIG. 1.

Handling of the fluid operated speed-change mechanism 34 for changing the speed-change ratio, namely position-changing operation for the change-over valve 89, is carried out by a handling lever 154 (FIG. 1) projected upwardly from the valve housing 85. Handling of the mechanically operated speed-change mechanism 36 for changing the speed-change ratio, namely displacing operation for the shiftable gears 104, 105 and 106, is carried out by a handling lever 155 (FIG. 1) projected upwardly from the front transmission case 22. Connection between these handling levers 154, 155 and the members to be handled by such levers may also be constructed in any of the known fashions.

Figure 10:
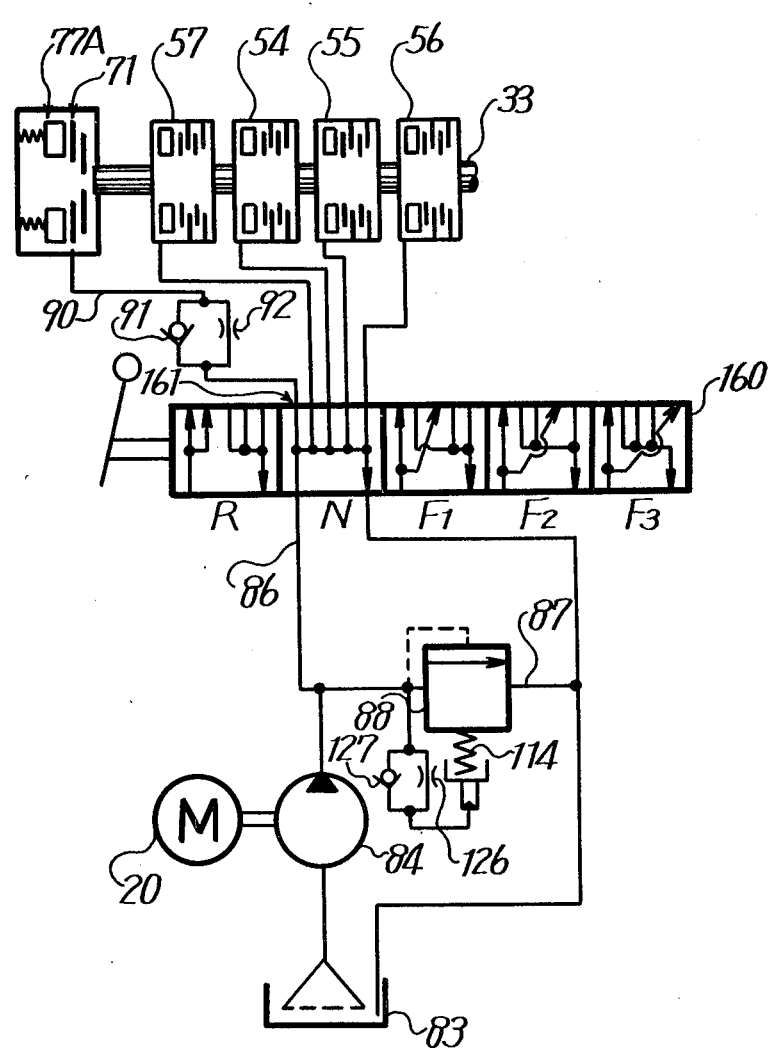
FIG. 10 is a schematic illustration of fluid circuit similar to FIG. 5 but showing another embodiment of the power transmission according to the present invention.

Turning to a consideration of another embodiment shown in FIG. 10, change-over valve 160 employed in this embodiment which valve corresponds to the aforementioned change-over valve 89 is particularly provided with an additional secondary or outlet port 161 which is then connected through a circuit 90 to the fluid chamber 82 of the fluid actuator 77A for releasing the braking by the brake means 71. The change-over valve 160 is constructed such that it acts not only similarly to the aforementioned change-over valve 89 but to change fluid circuit so that pressure fluid is supplied to the fluid actuator 77A at the operation positions $F_1$, $F_2$, $F_3$ and R of the valve and fluid is drained from the fluid actuator 77A at the neutral position N of the valve, as can be seen from FIG. 10. It is needless to say that, in this case too, the lay shaft 33 is braked by the brake means 71 at the non-operation state of the fluid operated speed-change mechanism 34 or at the neutral position N of the change-over vlave 160, whereas the braking of the lay shaft 33 is released at the operation state of the fluid operated speed-change mechanism 34 or at any of the operation positions $F_1$, $F_2$, $F_3$ and R of the change-over valve 168, as is the case of the embodiment shown in FIGS. 1 to 9.

Figure 11:
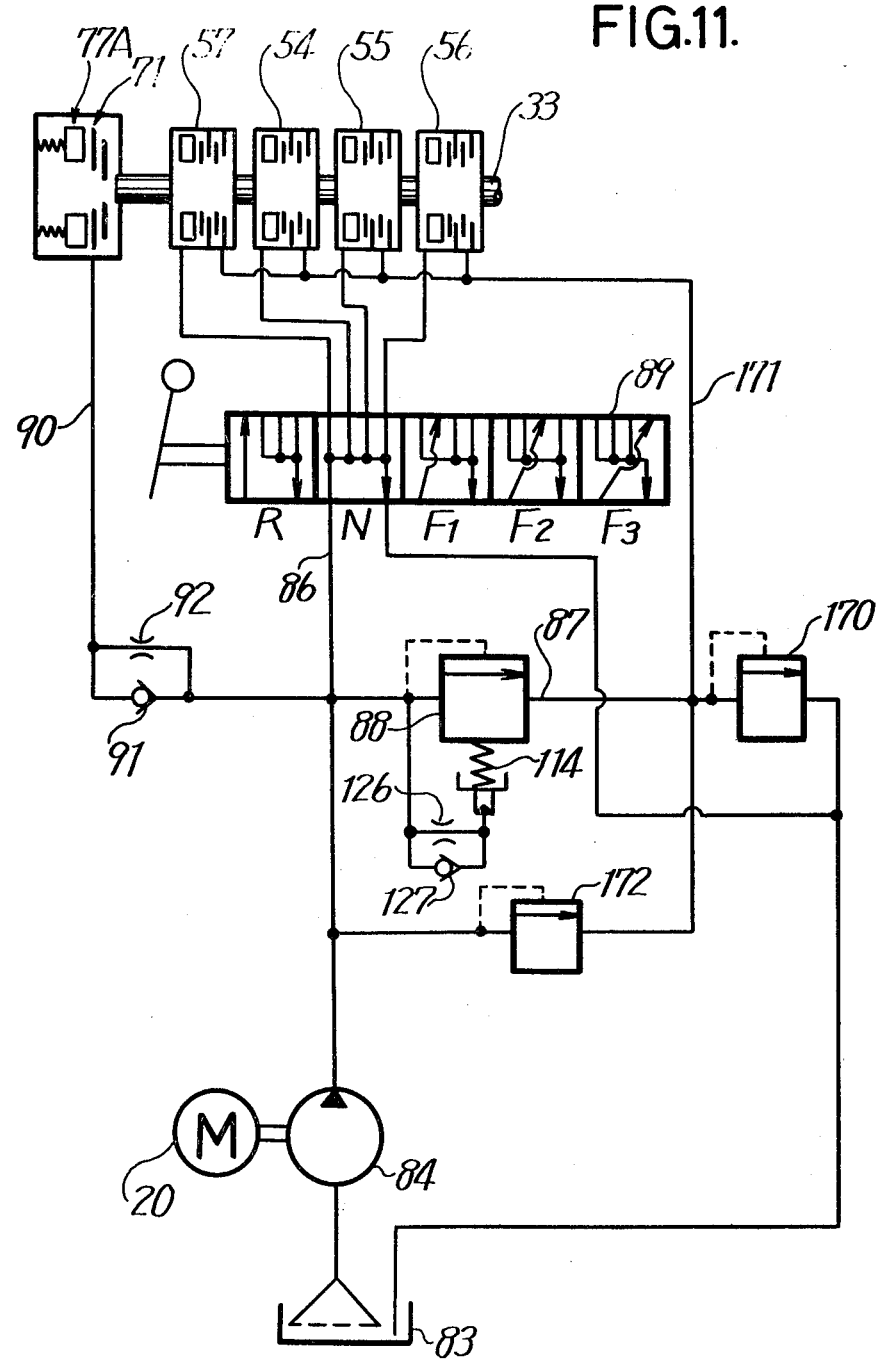
FIG. 11 is a schematic illustration of fluid circuit similar to FIG. 5 but showing a further embodiment of the power transmission according to the present invention.

Turning to a consideration of a further embodiment shown in FIG. 11, a part of fluid or oil for actuating the fluid actuated clutches 54 to 57 is supplied, in this embodiment, to the spaces for arranging the aforementioned friction elements 60 and 61 of such clutches as lubricant for preventing wearing of such elements. This embodiment is an example for showing a possibility that supply and drain of fluid for the fluid actuator 77A associated with the brake means 71 can be made without any trouble even when lubricating system of this type is employed.

As shown in FIG. 11, the aforementioned circuit 87 has behind the relief valve 88 another relief valve 170 inserted therein for determining or establishing pressure of lubricant. From the circuit 87 is branched, at between the relief valves 88 and 170, a lubricant supply path or circuit 171 which is then connected to the fluid actuated clutches 54, 55, 56 and 57 at the spaces where the friction elements 60 and 61 are arranged. Such connection of the lubricant supply circuit 171 to the fluid actuated clutches 54 to 57 may be made in a fashion such that the relief valve 170 for establishing pressure of lubricant is arranged, similarly to the aforementioned arrangement of the relief valve 88, within the aforementioned valve housing 85 and the supply circuit 171 is formed, similarly to the aforementioned formation of circuit between the change-over valve 89 and each of the fluid chambers 62 of the clutches 54 to 57, by fluid passages perforated respectively through the aforementioned top wall of the transmission case 22, through the aforementioned passage-forming plate 93 and through the seal housing 65, a fluid chamber formed between the seal housing 65 and the lay shaft 33, and a fluid passage perforated through the lay shaft 33. Meanwhile, in the embodiment shown in FIG. 11, a further relief valve 172 for establishing fluid pressure applied to the fluid actuated clutches 54 to 57 is provided in parallel to the aforementioned relief valve 88. This further relief valve 172 is designed such that it determines a maximum value of fluid pressure applied to the fluid actuated clutches 54 to 57. In other words, fluid pressure established or caused by the relief valve 172 at the relief operation thereof is designed to be lower than the maximum fluid pressure caused by the relief valve 88, namely, fluid pressure caused by the valve 88 when the aforementioned control piston 123 has reached the most advanced position shown with imagined line in FIG. 6. Consequently, after the fluid pressure established by the relief valve 88, which pressure is gradually enlarged with the advance of the control piston 123, has reached the fluid pressure which is to be established by the relief valve 172, fluid pressure of a constant value determined by the relief valve 172 is applied to the fluid actuated clutches 54 to 57.

As also shown in FIG. 11, fluid circuit 90 for the fluid actuator 77A is connected at the base end thereof, similar to the one shown in FIG. 5, to the fluid supply circuit 86 between the pump 84 and change-over valve 89 so that, as is the case of the circuit system shown in FIG. 5, fluid is drained from the fluid actuator 77A through the circuits 90 and 86 and through the change-over valve 89 at the neutral position N of the change-over valve 89, thereby operating the brake means 71. The fluid actuator 77A is supplied with pressure fluid through the circuit 80 at the operation positions $F_1$, $F_2$, $F_3$ and R of the change-over valve 89, thereby releasing the braking by the brake means 71. In addition, when there are arranged in parallel a relief valve 88 for gradually enlarging fluid pressure applied to fluid actuated clutches 54 to 57 and a relief valve 172 for determining maximum fluid pressure applied to such clutches 54 to 57, as is the case of the embodiment shown in FIG. 11, there is given a possibility that, by fashioning the latter relief valve 172 such that fluid pressure established or determined thereby is variable as known per se, transmission of a large torque through a clutch of the fluid